United States Patent [19]

Furuta et al.

[11] Patent Number: 5,289,101
[45] Date of Patent: Feb. 22, 1994

[54] BATTERY CHARGER WITH CHARGING CURRENT CONTROLLER

[75] Inventors: Masami Furuta, Kawasaki; Takao Iwatsuki, Anjo; Masatoshi Sugiura, Anjo; Toshio Matsumoto, Anjo; Hideki Watanabe, Anjo; Hideiki Niwa, Nagoya, all of Japan

[73] Assignees: Fuji Electric Co., Ltd., Kawasaki; Makita Corporation, Anjo; Okada Electric Co, Ltd., Nagoya, all of Japan

[21] Appl. No.: 690,563

[22] Filed: Apr. 24, 1991

[30] Foreign Application Priority Data

Apr. 27, 1990 [JP] Japan .................. 2-113981
Apr. 27, 1990 [JP] Japan .................. 2-113982

[51] Int. Cl.$^5$ .............................. H02J 7/00
[52] U.S. Cl. ........................ 320/21; 363/21
[58] Field of Search ............ 320/21, 31, 32, 39, 320/40; 363/18, 19, 20, 21

[56] References Cited

U.S. PATENT DOCUMENTS

| | | | |
|---|---|---|---|
| 4,058,758 | 11/1977 | Peterson | 363/21 X |
| 4,371,286 | 2/1983 | Shelly | 320/21 |
| 4,472,672 | 9/1984 | Pacholok | 320/39 X |
| 4,649,464 | 3/1987 | Shono | 363/21 |
| 4,654,573 | 3/1987 | Rough et al. | 320/21 X |
| 4,736,264 | 4/1988 | Segger | 361/18 |
| 4,763,235 | 8/1988 | Morita | 363/19 |
| 4,777,424 | 10/1988 | Sakamura et al. | 320/21 |
| 4,855,663 | 8/1989 | Matsui et al. | 320/21 X |

FOREIGN PATENT DOCUMENTS

| | | |
|---|---|---|
| 0170944 | 2/1986 | European Pat. Off. |
| 0203444 | 12/1986 | European Pat. Off. |
| 3622986 | 1/1988 | Fed. Rep. of Germany |
| 3627858 | 2/1988 | Fed. Rep. of Germany |
| 1578922 | 11/1980 | United Kingdom ........... 320/21 |
| 2090084 | 6/1982 | United Kingdom ........... 320/32 |

OTHER PUBLICATIONS

NTELEC '86 Conference Proceedings (International Telecommunications Energy Conference) "A Low-Power Constant Current Converter ...", Koyashiki et al., Oct. 22, 1986, pp. 229-233.

Primary Examiner—K. Peckman
Attorney, Agent, or Firm—Dennison, Meserole, Pollack & Scheiner

[57] ABSTRACT

A battery charger includes a transformer having a primary coil and a secondary coil, a switch for duty control of a current flowing through the primary coil of the transformer, a detector for detecting a value of a current flowing through the secondary coil of the transformer, and a secondary controller for receiving the detected value from the detector and for outputting a charge control signal. The pulse of the charge control signal is modulated in accordance with the detected value by the detector. The battery charger further includes a light emitter controlled by the charge control signal for flickering, a phototransistor turning on and off according to the flickering of the light emitter, and a primary controller for converting the ratio of the time during on of the phototransistor to the time during off of the phototransistor into an analog value, and for outputting to the switch a pulse signal which is modulated to have a duty cycle corresponding to the analog value so as to control a duty cycle of the switch.

2 Claims, 5 Drawing Sheets

BATTERY CHARGER WITH CHARGING CURRENT CONTROLLER

BACKGROUND OF THE INVENTION

1. Field of the Invention

The present invention relates to a battery charger for charging a battery pack of an electric appliance such as an electric cleaner and a power driven tool, and more particularly to an improvement in a circuit configuration of the battery charger.

2. Description of the Prior Art

General circuit configuration of a conventional battery charger of constant current type is shown in FIG. 6. The circuit comprises of a primary DC power circuit 1 for rectifying and smoothing an AC power derived from a commercial AC power source (not shown) through AC terminals 1a, 1b, a field-effect transistor FET having an insulated gate and operating as a chopper for intermitting, at a predetermined frequency, a DC power supplied from the primary DC power circuit 1. The circuit also includes a transformer T for drop of voltage having a primary coil for receiving the intermitting DC power from the field-effect transistor FET and a secondary coil for outputting a voltage-dropped power of the intermitting waveform, a secondary DC power circuit 2 for rectifying and smoothing the voltage-dropped power, a current detector circuit 3 for detecting a charging current I, a secondary control circuit 4 for outputting a pulse signal (hereinafter called a charge control signal S2) the pulse width of which is modulated in such a manner that it becomes smaller when the charging current I is large and that it becomes larger when the charging current I is small, and a primary control circuit 5 for varying the duty cycle of an on-off gate signal G1 to be supplied to the field effect transistor FET.

A battery pack 6 comprises battery 6 to be charged and a thermostat THM connected in series with the battery B for detecting charging-up of the battery B. The battery pack 6 is mounted on a mounting portion formed with a body (not shown) of the battery charger for fixedly receiving the battery pack 6, so that terminals 6a, 6b and 6c of the battery pack 6 are electrically connected with a positive terminal 7a, a negative terminal 7b and a thermostat terminal 7c of the battery charger, respectively. Assuming that the battery B is normal, the battery B is initially charged at a very little current through a diode D1, a resistor R1 for limiting the current and a heat-sensitive protection element such as an OCR on a side of the battery charger. The current detector circuit 3 subsequently detects the charging current I based on the voltage across a shunt resistor R2 and outputs a current detector signal S1 to the secondary control circuit 4 which detects a charging voltage V. The secondary control circuit 4 excites its internal relay coil (not shown) so as to close a relay switch SW, so that the battery B may be charged on full-scale. At the same time with such full-scale charging, the exciting current of the relay coil of the secondary control circuit 4 flows through the terminal 7c (6c), the thermostat THM and the terminal 7b (6b). (In FIG. 6, the configuration of the secondary control circuit is partly omitted.)

The battery charger of this type is constructed to charge the battery B by supplying the charging current of constant value. When the analog value of the voltage of the current detector signal S1 from the current detector circuit 3 does not reach a predetermined value, a larger amount of the charging current is supplied to the secondary side. Thus, the secondary control circuit 4 produces the charge control signal S2, the pulse of which has been modulated to have a large width, and the charge control signal S2 is subsequently supplied to the primary control circuit 5 as an analog signal through CR integration circuit 8 of a PWM demodulation circuit and a photocoupler (optical isolator) PC1. (PWM means pulse width modulation.) The primary control circuit 5 produces the gate control signal G1 of relatively large duty cycle corresponding to the pulse with large width and supplies the same to the field-effect transistor FET. Then, the current flowing through the primary coil of the transformer T increases, so that the current flowing through the secondary coil also increases to the effect that more charging current is supplied to the battery B. This means the charging current of constant value is supplied to the battery B.

When the battery pack 6 having the battery B which is short circuited is mounted on the battery charger, an excessive current flows through the shunt resistor R2. This may be also caused when the battery B is defective. Such excessive current is detected by the current detector circuit 3 which supplies an excessive current detecting signal S3 to the primary control circuit 5 through a photocoupler PC2. The primary control circuit 5 modulates the gate control signal G1 to have a smaller duty cycle based on the excessive current detecting signal S3. The charging current of the secondary side therefore decreases, so that the supply of the excessive current to the battery B can be relieved.

In FIG. 6, R3 to R6 are resistors and C1 is a capacitor.

The prior art battery charger as described above has the following drawbacks:

The charge control signal S2 having a modulated pulse width and outputted from the secondary control circuit 4 is firstly converted to an analog signal S2' by the CR integration circuit 8 of the PWM demodulation circuit. The analog signal S2' is applied to a light emitting diode LED and therefore, it is drawn by an emitter of a phototransistor Tr1 of the photocoupler PC1. The photocoupler PC1 is used to provide different values between the primary earth voltage and the secondary earth voltage so as to attain electrical insulation. The photocoupler PC1 has, however, a transfer characteristic (such as hFE) which varies with photocouplers, and it has inferior temperature characteristic. Further, it considerably deteriorates with age. Therefore in manufacturing a circuit of a battery charger, it requires to select photocouplers which have the similar characteristics to each other and to make a fine control while remaining low reliability to the variation with age. Particularly, the emitter voltage of the phototransistor Tr1 as a light receiver is not linearly identical with the voltage of the analog signal S2'. Therefore, it is difficult to reliably transfer the analog signal S2', and the duty cycle of the gate control signal G1 from the primary control circuit 5 inevitably includes an error. Thus, the prior art has a problem in its control system.

Further, in the prior art charging circuit, for limiting the excessive charging current which may be caused on the secondary side, the duty cycle of the gate control signal to be supplied from the primary control circuit is compulsorily limited in the path from the current detector circuit 3 to the photocoupler PC2 which acts as an information transmitter from the secondary side to the primary side, so that the amount of supply of power to the secondary side can be decreased. However, in such prior art charging circuit, a transient limitation is very difficult when the current is abruptly increased to reach an excessive value. Further, since the path of transmission of the information is rather long, the response is notably delayed and it cannot meet with immediate current limitation. The battery charger is applied to charge various types of batteries, and there is some possibility to cause excessive heating when the excessive current has been produced during the charging operation.

SUMMARY OF THE INVENTION

It is, accordingly, an object of the present invention to provide a battery charger including a signal transmitting system which can accurately transfer a charge control signal from a secondary control circuit to a primary control circuit by using a photocoupler which is not expensive but has a transfer characteristic varying with photocouplers and an inferior temperature characteristic.

It is another object of the present invention to provide a battery charger including a control system for limiting an excessive current which can quickly respond, so that it can prevent even the production of the transient excessive current on the secondary side.

According to the present invention, there is provided a battery charger comprising:

a transformer having a primary coil and a secondary coil a switch for duty control of a current flowing through the primary coil of the transformer;

a detector for detecting a value of a current flowing through the secondary coil of the transformer;

a secondary controller for receiving the detected value from the detector and f or outputting a charge control signal, the pulse of which is modulated in accordance with the detected value by the detector;

a light emitter controlled by the charge control signal for flickering;

a phototransistor turning on and off according to the flickering of the light emitter; and a primary controller for converting the ratio of the time during on of the phototransistor to the time during off of the same into an analog value, and for outputting to the switch a pulse signal which is modulated to have a duty cycle corresponding to the analog value so as to control a duty cycle of the switch.

In the present invention, a photocoupler which may be comprised of the light emitter and the phototransistor does not transmit an analog signal but transmits an on-off signal. For this purpose, the light emitter is flickered directly by the pulse signal which is modulated in its pulse width and outputted from the secondary controller. The emitted light is converted into the on-off signal by the phototransistor and further converted to the analog value. Thus, in the present invention, the conversion into the analog value is made after transmission to the primary side.

With such construction, the photocoupler is required to merely transmit the on-off signal, so that the tolerance of the transfer characteristic of the photocoupler becomes large. Thus, the performance required for the photocoupler is satisfactory to have a function to merely discriminate its logical amplitude (H level or L level). Therefore, it substantially does not cause any problem from the variations in the transfer characteristic with different photocouplers and the inferior temperature characteristic, etc.

After the charge control signal or the signal having the modulated pulse width reaches to the primary side, this signal is converted into the analog value or the analog signal through a demodulation means such as an integration circuit, and a switch control signal having a duty cycle corresponding to the analog value is transmitted from the primary control means to the switch. Therefore, the charging current is accurately controlled to have a predetermined value even if the characteristic of the photocoupler is not so good.

The battery charger may further include a second detector for detecting a value of a current flowing through the primary coil of the transformer, a comparator for receiving the detected value from the second detector and for comparing the detected value with a predetermined value, and means for compulsorily turning off the pulse signal which is applied to turn on the switch when the detected value exceeds the predetermined value.

With such construction, the charging current may not be supplied when the detected value of the current flowing through the primary coil of the transformer exceeds the predetermined value, so that the time between the production of an excessive current and the limitation of the excessive current can be shortened and therefore, the battery can be reliably protected.

The invention will become more apparent from the claims and the description as it proceeds in connection with the drawings.

DETAILED DESCRIPTION OF THE INVENTION

Figure 1:
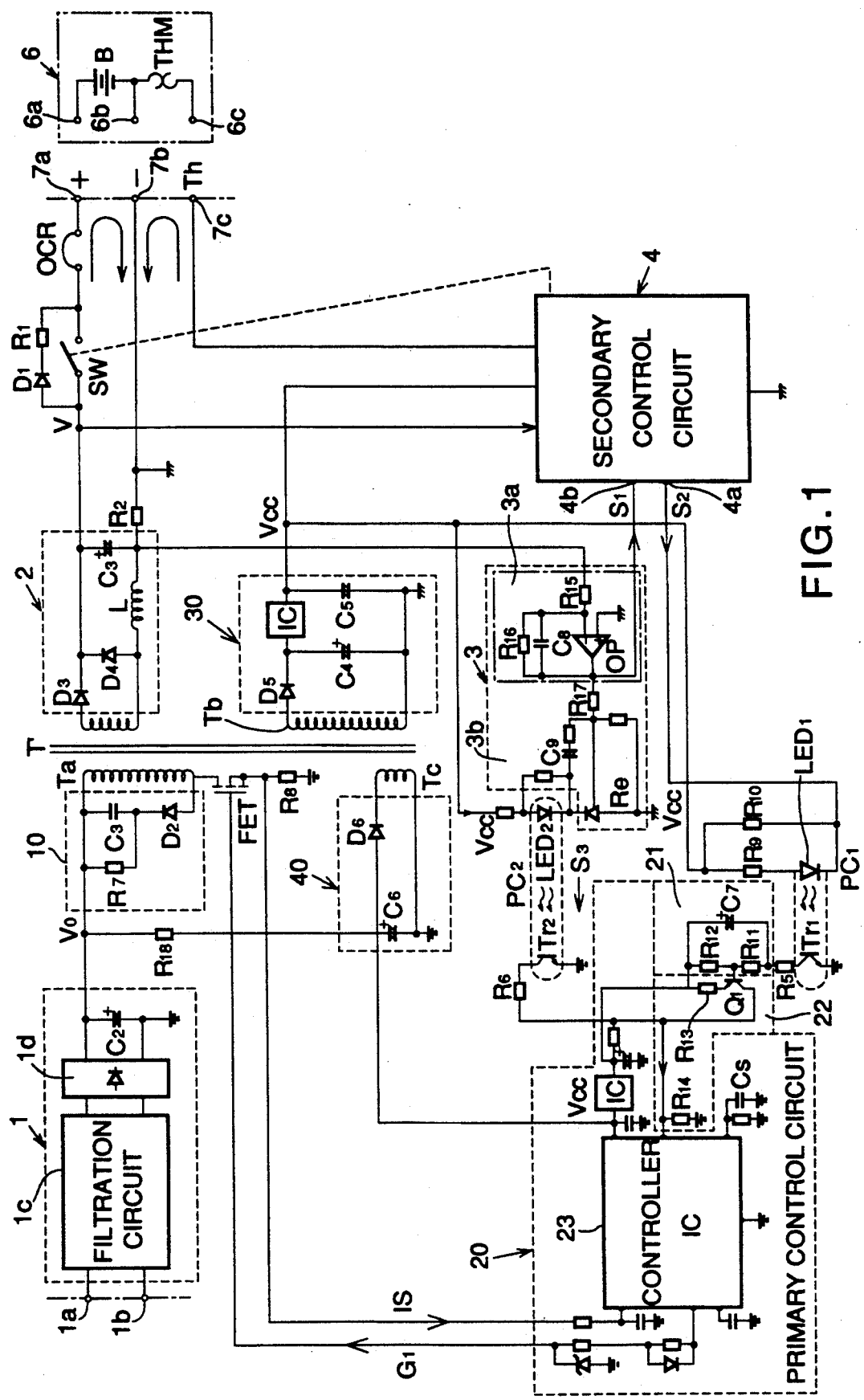
FIG. 1 is a circuit configuration of a battery charger according to the present invention.
Figure 6:
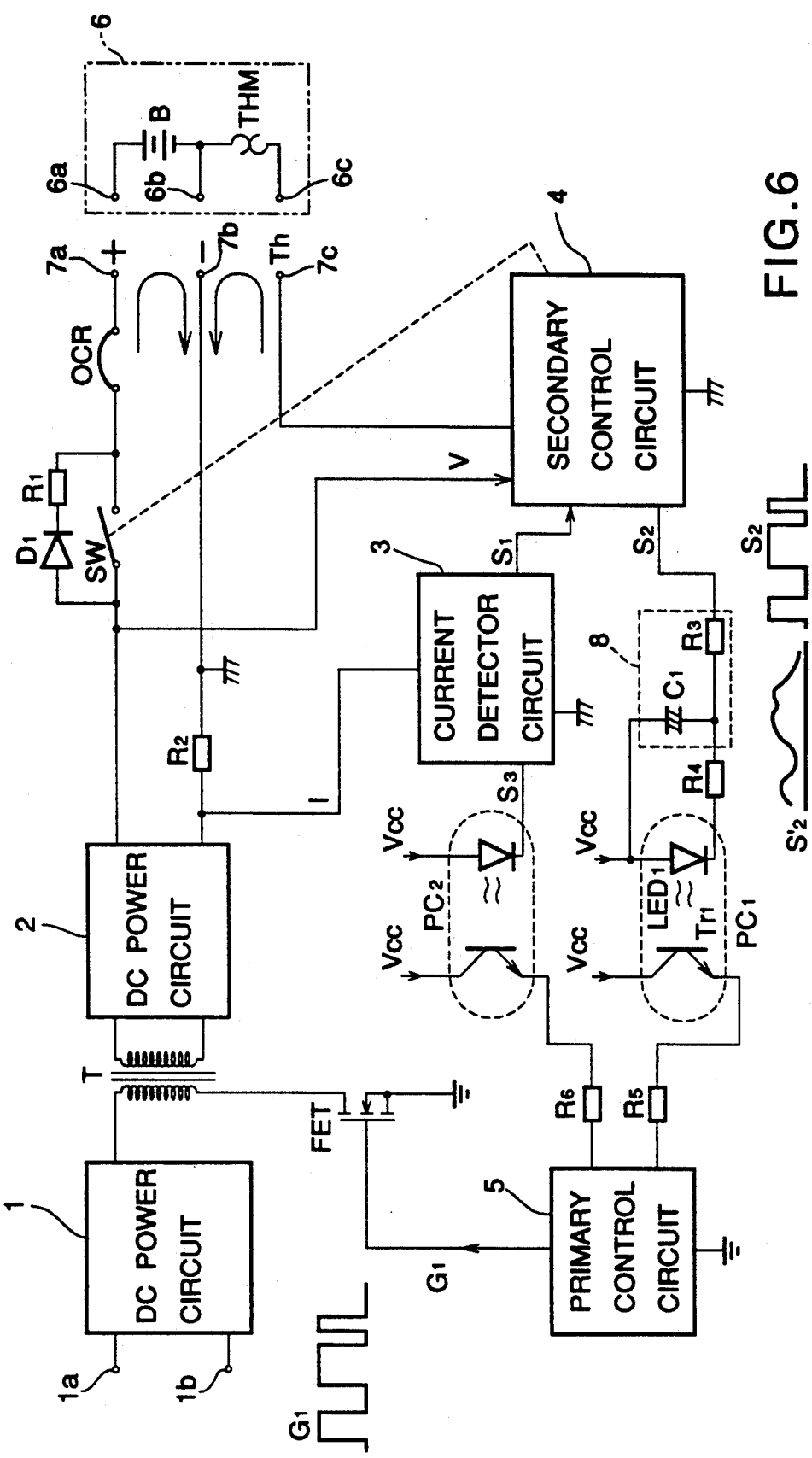
FIG. 6 is a block diagram showing a circuit configuration of a battery charger of the prior art.

Referring to FIG. 1, there is shown a circuit configuration of a battery charger according to the present invention. In FIG. 1, the same elements as shown in FIG. 6 are labeled by the same numerals, and an explanation for these elements is omitted.

A primary DC power circuit 1 comprises of a filtration circuit 1c for eliminating noise, a diode bridge circuit 1d and a smoothing capacitor C2. A noise elimination circuit 10 including a resistor R7, a capacitor C3 and a diode D2 is connected across a primary main coil Ta of a Transformer T' for drop of voltage. A field-effect transistor FET having an insulated gate and operating as a chopper is connected in series with a shunt resistor R8 between the primary coil Ta and the earth. The transistor FET is intermittently turned at a predetermined frequency by a gate control signal G1 which has a variable duty cycle and is derived from a primary control circuit 20 as will be hereinafter explained.

A secondary DC power circuit 2 comprises of rectifying diodes D3 and D4, a current limiting coil L and a smoothing capacitor C3. A DC stabilization power circuit 30 for supplying a line voltage Vcc (5 V) to a secondary control circuit 4 and a current detector circuit 3, etc. is connected with a secondary shunt coil Tb of the transformer T'. The DC stabilization power circuit 30 includes a rectifying diode D5, a three-terminal regulator IC and capacitors C4 and C5. A DC power circuit 40 for supplying the line voltage Vcc (5 V) for the primary control circuit 20 etc. is connected with a primary shunt coil Tc of the transformer T'. The DC power circuit 40 includes a rectifying diode D6 and a smoothing capacitor C6.

A photocoupler PC1 for transmitting a charge control signal (feedback signal) S2 from the secondary side to the primary side includes a light emitting diode LED1 as a light emitter and a phototransistor Tr1 as a light receiver. The anode of the light emitting diode LED1 is connected with a secondary Vcc power source through a resistor R9, and the cathode of the same is connected with a charge control signal output terminal 4a of the secondary control circuit 4. A resistor R10 is connected in parallel with the light emitting diode LED1 and the resistor R9. On the other hand, the collector of the phototransistor Tr1 is connected with a second terminal of a controller IC 23 through a resistor R5, a PWM demodulation circuit 21 and an error amplifier 22. The PWM demodulation circuit 21 is an integration circuit including bleeding resistors R11 and R12 connected in series with each other and a charge/discharge capacitor C7 connected in parallel with the resistors R11 and R12. The positive terminal of the charge/discharge capacitor C7 is connected with a primary Vcc power source (applied to the sixth terminal of the controller IC 23) through a three-terminal regulator IC and is pulled up to the voltage Vcc. The error amplifier 22 includes a PNP transistor Q1, an emitter resistor R13 and a collector resistor R14 the voltage of which is applied to the second terminal of the controller IC 23.

Figure 2:
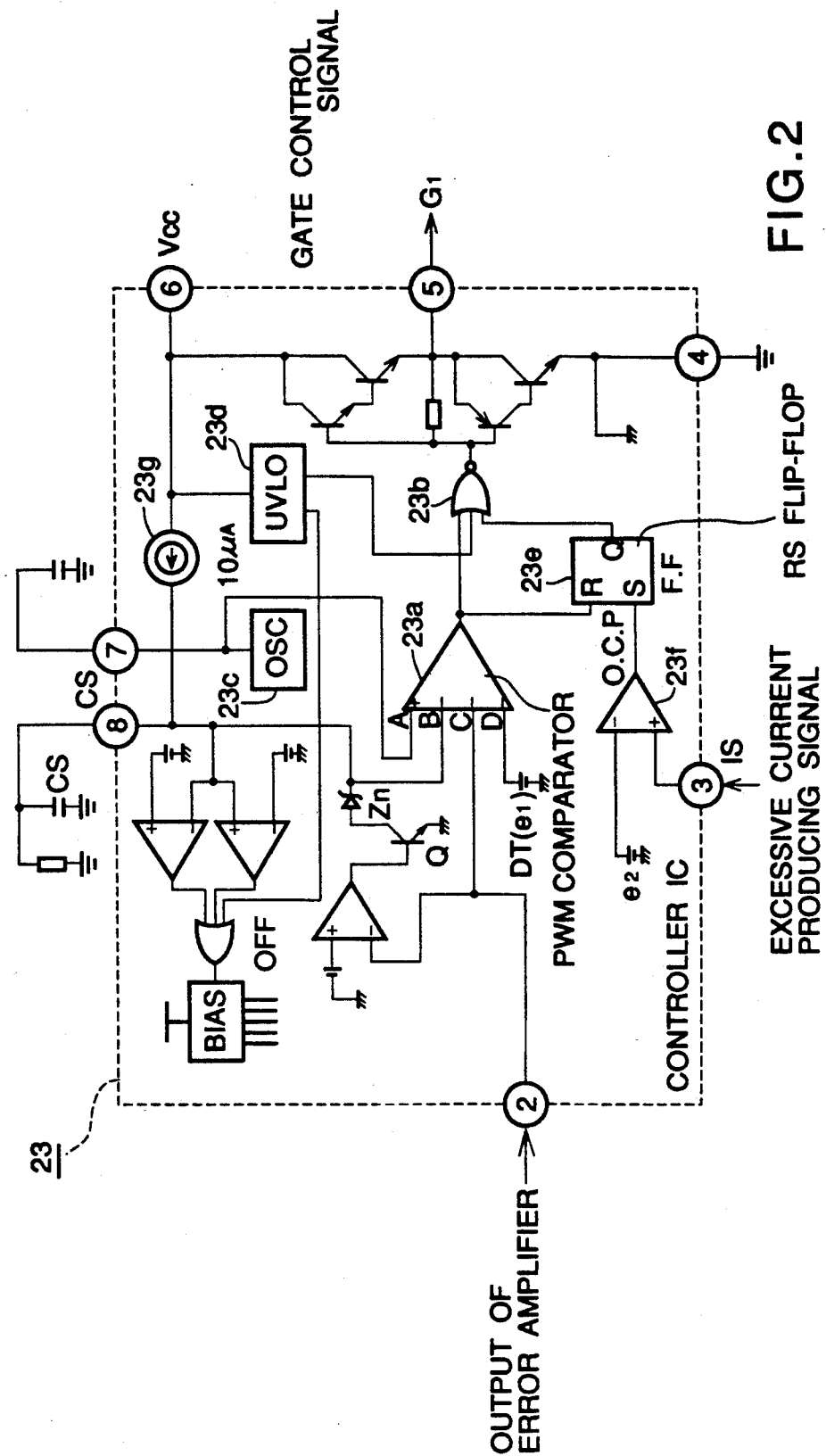
FIG. 2 is a block diagram showing a circuit configuration of an IC for controlling a primary side of the circuit shown in FIG. 1.

The controller IC 23 may be commercially obtained from Fuji Electric Co., Ltd. of Japan under the model number FA50304P, and its detailed circuit configuration is shown in FIG. 2 with a part omitted. The explanation of all of the elements of the controller IC 23 will make it rather difficult to understand the present invention, and the explanation will be hereinafter made in connection with only the elements which are concerned with the present invention.

A PWM comparator 23a transmits the gate control signal G1 of PWM wave (pulse width modulated wave) and has four input terminals A, B, C and D. The PWM comparator 23a compares an output of an internal oscillator (OSC) 23c with a CS terminal voltage applied to the input terminal B, an output of the error amplifier 22 applied to the input terminal C through the second terminal, and a DT voltage applied to the input terminal D in such a manner that the output of the internal oscillator 23c is preferentially compared with the lowest voltage among the CS terminal voltage, the output of the error amplifier 22 and the DT voltage. The output of the PWM comparator 23a becomes higher level during the period when the lowest voltage is lower than the output of the oscillator 23c, while it becomes lower level during the period when the lowest voltage is higher than the output of the oscillator 23c. When the output of the PWM comparator 23a is of lower level, the output of an NOR gate 23b or the voltage at the fifth terminal becomes higher level. The NOR gate 23b includes three input terminals to which the output of the PWM comparator 23a, an output of a low-voltage malfunction prevention circuit (U.V.L.O.) 23d, and a Q output of a RS flip-flop 23e are applied, respectively. The low-voltage malfunction prevention circuit (U.V.-L.O.) produces its output when the line voltage of the controller IC 23 has reached a sufficient value so as to prevent malfunction of the circuits of the controller IC 23 during the period of insufficient line voltage at the beginning of turning on of the power to the controller IC 23. A set input terminal S of the RS flip-flop 23e receives an output of a comparator 23f while a reset input terminal R receives the output of the PWM comparator 23a. A detecting input terminal of the comparator 23f receives an excessive current production signal IS (which will be hereinafter explained) through the third terminal. A capacitor CS is a timing capacitor and is connected with the eighth terminal for adjusting a gentle starting period at the beginning of turning on of the power. Here, the primary control circuit 20 includes several resistors, capacitors and diodes which will not be explained in detail but perform auxiliary functions such as biasing, phase adjustment and prevention from ruin.

The current detector circuit 3 includes an inverting amplifier 3a for detecting a value of the charging current as a voltage value and a driver circuit 3b of a light emitting diode LED2 in a photocoupler PC2. The inverting amplifier 3a includes an operational amplifier OP which receives at its inverting input terminal a value of voltage drop (negative value) at the shunt resistor R2 assembled into a charging current circuit, through an input resistor R15. The inverting amplifier 3a further includes a feedback resistor R16 and a feedback capacitor C8 for the operational amplifier OP. The inverted and amplified output of the inverting amplifier 3a is supplied as a current detector signal S1 to a terminal 4b of the secondary control circuit 4 and is also supplied to a shunt regulator Re connected in series with the light emitting diode LED2 through a resistor R17. The voltage across the shunt regulator Re is maintained at a value substantially the same as the charging voltage of a capacitor C9. When the output voltage of the operational amplifier OP exceeds a predetermined value, the current flows through the shunt regulator Re, so that the light emitting diode LED2 emits the light. The collector of a phototransistor Tr2 in the photocoupler PC2 is connected with a second terminal of the controller IC 23 through a resistor R6 and is pulled up to the line voltage Vcc.

The characteristic operations of the above circuit will be hereinafter explained in connection with the various situations.

Charge Starting Period

Figure 3:
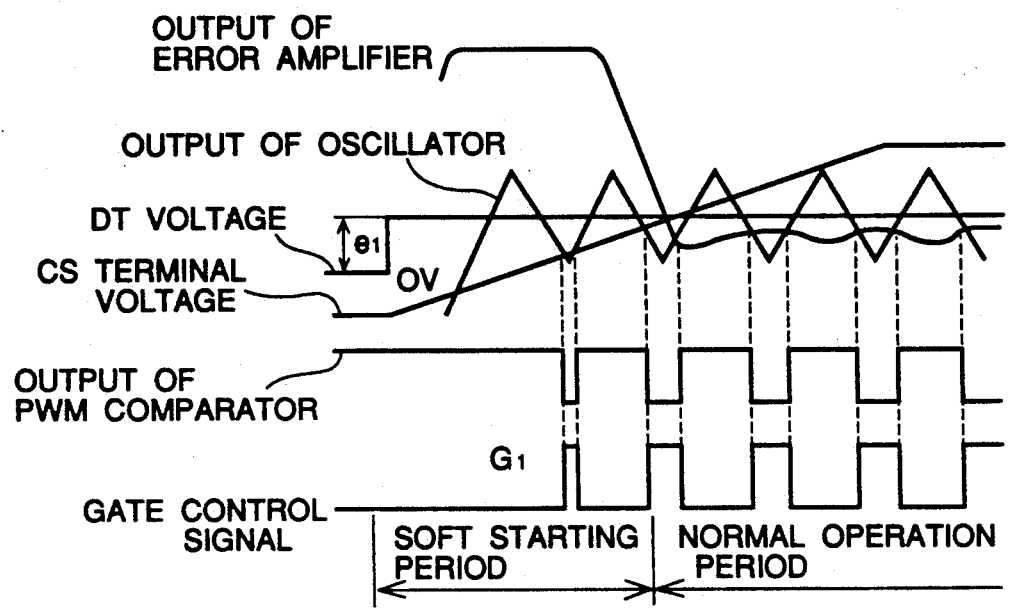
FIG. 3 is a timing chart showing wave configurations of various signals in the circuit shown in FIG. 1 during a starting period and a normal operation period.

When an AC power source is turned on to supply power to the primary side, a constant voltage V0 is outputted from the DC power circuit 1, and the primary line voltage Vcc is supplied to the sixth terminal of the controller IC 23 through a bleeding resistor R18. Further, an output (higher level) of the low-voltage malfunction prevention circuit 23d is applied to the NOR gate 23b, etc. The timing capacitor CS is simultaneously charged by a power source 23g of constant current (10 μA), and the CS terminal voltage gradually increases accordingly by a predetermined time constant as shown in FIG. 3. Additionally, as the power is turned on, the oscillator 23c continuously outputs a triangle wave as shown in FIG. 3. At such beginning of turning on of the power, the error amplifier 22 outputs its maximum voltage as shown in FIG. 3 based on the charge control signal S2 derived from the secondary control circuit 4. Since the PWM comparator 23a compares the output of the oscillator 23c with the lowest voltage among the CS terminal voltage, the output of the error amplifier 22 and the DT voltage (e1), the output of the oscillator 23c is preferentially compared with the CS terminal voltage at the beginning of turning on of the power, so that soft starting is performed. The pulse width (duty cycle) of the output of the PWM comparator 23a and that of the gate control signal G1 as an inverting output of the PWM comparator 23a become gradually larger, and the period of turning on of the transistor FET as a chopper becomes longer accordingly, so that the amount of power supply to the secondary side monotonously increases. The DC voltage is thus produced from the secondary DC power circuit 2 and the charging to a battery B is started according to the aforementioned operation.

Normal Operation Period

Figure 4A:
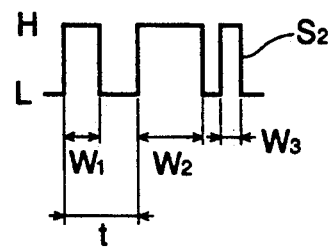
FIG. 4A is a diagram showing a wave configuration of a charge control signal of the circuit shown in FIG. 1.

The charging current I produces a voltage drop at the shunt resistor R2 while the current detector circuit 3 detects the value of such voltage drop. Thus, the value of the voltage drop becomes larger as the charging current I increases and the voltage of the current detector signal S1 increases accordingly. On the other hand, the voltage of the current detector signal S1 decreases as the charging current I decreases. The secondary control circuit 4 includes a PWM modulator (not shown) for modulating the pulse width of the current detector signal S1 so as to produce the charge control signal S2, and a pulse width modulated wave (PWM wave) of the charge control signal S2 as shown in FIG. 4A is supplied from the terminal 4a of the secondary control circuit 4 to the photocoupler PC1. The pulse width w1 corresponds to the situation where t h e current coincides with a predetermined current such as 6A, the pulse width w2 corresponds to the situation where the current is insufficient, and the pulse width w3 corresponds to the situation where the current is excessive. The period of time of one cycle is indicated by t.

Figure 4B:
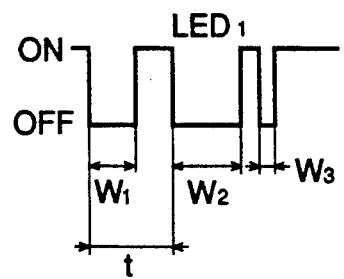
FIG. 4B is a diagram showing a timing of turning on and off of a photocoupler corresponding to FIG. 4A.
Figure 4C:
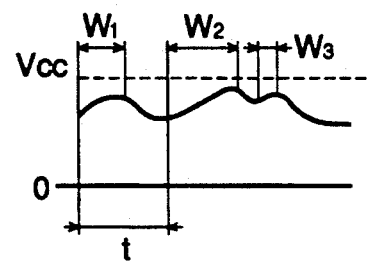
FIG. 4C is a diagram showing a wave configuration of the base voltage of a transistor corresponding to FIG. 4A.

The light emitting diode LED1 of the photocoupler PC1 becomes off (light emitting state) when the PWM wave is at higher level (H), while it becomes on or no light is emitted when the PWM wave is at lower level (L) as shown in FIG. 4B. The phototransistor Tr1 of the photocoupler PC1 turns on or off according to turning on or off of the light emitting diode LED1 so as to produce a digital signal. The digital signal is converted into an analog signal by the PWM demodulation circuit 21, and the base voltage of the transistor Q1 has such wave configuration that is directly demodulated from the PWM wave of the charge control signal S2 (see FIG. 4C).

The PWM wave as the charge control signal S2 is directly transmitted to the primary side through the photocoupler PC1 and is converted into the analog signal by the PWM demodulation circuit 21 at the primary side. Therefore, the problem in the signal transmission which may be caused by the variations in the characteristic or the inferior temperature characteristic of the photocoupler PC1 can be dissolved. Thus, the emission control of the light emitting diode LED1 is not performed based on the analog emitting amount but is performed merely to emit or not to emit the light as an on-off switching control. Therefore, the variation in the characteristic of the photocoupler PC1 does not cause serious problem. Further, the inferior temperature characteristic does not cause any problem since the logical amplitude can be determined to have a sufficient value. Additionally, the circuit has high reliability in the variation with age and has long life. Therefore, it is possible to utilize a photocoupler which is not expensive. That is to say, the accuracy of the charge control becomes higher than that of the prior art, and the battery charger can flexibly meet with the situation of the battery to be applied. This may prevent unexpected accident such as a damage to the battery.

The PWM demodulation signal is applied to the base of the transistor Q1, and the output of the error amplifier 22 is supplied to the second terminal of the controller IC 23 as described above. When the output of the error amplifier 22 is dropped from the maximum value to reach a balanced state (the state of charging at a constant current) where this output has the lowest value to be compared with the output of the oscillator 23c as shown in FIG. 3. Consequently, the duty cycle of the output of the PWM comparator 23a and the gate signal G1 is modulated as shown in FIG. 3 during the normal operation period, so that the battery B is charged with a constant current.

Charging Current Increasing Period

The charging current may increase when the impedance of the battery B has been abruptly lowered during the charging operation. Such increase of the charging current may reduce the pulse width of the PWM wave of the charge control signal S1 and lower the voltage of the output of the primary error amplifier 22. The pulse width of the PWM wave of the gate control signal G1 is narrowed accordingly so that the amount of the power supplied to the secondary side is decreased and the charging current to the battery B is lowered to recover the constant value. Such feedback control from the secondary side to the primary side follows to relatively gentle variation of the current during the normal operation period.

Excessive Current Production Period

When the charging current is relatively rapidly increased, the voltage of the current detector signal S1 abruptly increases. The light emitting diode LED2 of the photocoupler PC2 emits the light accordingly, and the phototransistor Tr2 is turned on, so that the voltage applied to the second terminal of the controller IC 23 (output of the error amplifier 22) is compulsorily lowered. This may limit the power supplied to the secondary side relatively rapidly. However, the information of the abrupt increase of the charge current on the secondary side is transmitted to the controller IC 23 on the primary side through the current detector circuit 3, the photocoupler PC2, etc. This may cause substantial delay in the response speed of the circuit, so that the limit control of the power supplied to the secondary side involves long time lag which may cause damage to the battery B.

Figure 5:
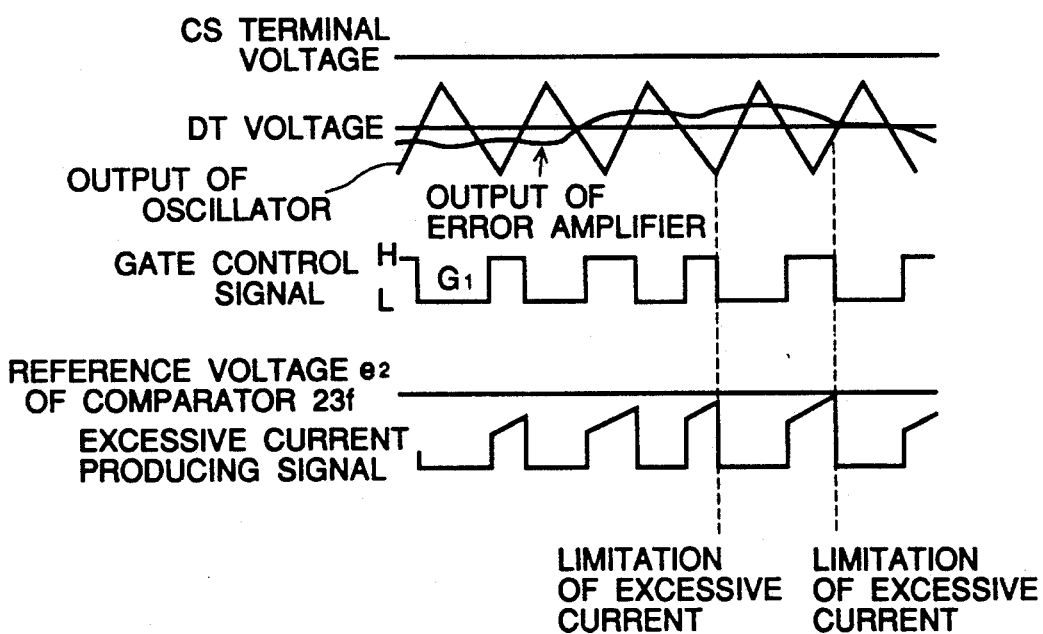
FIG. 5 is a timing chart showing wave configurations of various signals in the circuit shown in FIG. 1 in case that an excessive current has been produced.

To solve this problem, the battery charger of the present invention includes the circuit which can rapidly limit the excessive current. When the excessive current has been produced at the secondary side, the current flowing through the coil Ta on the primary side (the drain current of the transistor FET) is simultaneously abruptly increased and the voltage drop across the shunt resistor R8 is also increased, so that the voltage of an excessive current production signal IS connected with the third terminal of the controller IC 23 increases as shown in FIG. 5. In case that the voltage of the excessive current production signal exceeds the reference voltage e2 of the comparator 23f, the output of the comparator 23f becomes high level and the Q output of the RS flip-flop 23e also becomes high level accordingly. Further, the output of the NOR gate 23b becomes low level independently of the output of the PWM comparator 23a. Thus, the gate control signal G1 becomes low level, so that the transistor FET is compulsorily cut off and the drain current does not flow. Such compulsorily cut off of the transistor FET continues until the next cycle even if the output of the PWM comparator 23a is of high level and therefore, the amount of supply to the secondary side shall be rapidly decreased to immediately dissolve the excessive current. Consequently, the charging operation to the battery B can be completed without any problem such as damage even if the battery charger is used for the batteries B of various charging characteristics.

At the next cycle, the same current limitation operation shall be performed as described above if the current on the secondary side is still excessive. It is to be noted that, at the beginning of the next cycle, the gate control signal G1 temporary increases as shown in FIG. 5. The transistor FET is temporary turned on accordingly, and is compulsorily turned off with a little time lag if the current is excessive. If the excessive current has been detected and the transistor FET has been continuously completely kept off during few cycles after that, the secondary DC stabilization power circuit 30 cannot maintain the constant voltage and therefore, the secondary control circuit 4 cannot perform its function during such period. This means that the monitoring function is completely terminated.

In the present invention, however, the gate control signal G1 having a duty cycle with a little or minimum value is still transmitted to the transistor FET during the power limitation cycles where the excessive current exists so that at least the function of the power circuit of the control system can be maintained.

While the invention has been described with reference to a preferred embodiment thereof, it is to be understood that modifications or variations may be easily made without departing from the scope of the present invention which is defined by the appended claims.

What is claimed is:

1. A battery charger with a charging current controller comprising:
    a transformer having a primary coil and a secondary coil;
    a switch for duty control of a current flowing through said primary coil of said transformer;
    a detector for detecting a value of a charging current flowing through said secondary coil of said transformer;
    a secondary controller for receiving the detected value from said detector and for outputting a charge control signal, the pulse width of which is modulated in accordance with the detected value by said detector;
    a light emitter controlled by said charge control signal for flickering;
    a phototransistor turning on and off according to the flickering of said light emitter; and
    a primary controller for converting the ratio of the time during on of the phototransistor to the time during off of the phototransistor into an analog value, and for outputting to said switch a pulse signal which is modulated to have a duty cycle corresponding to the analog value so as to control a duty cycle of said switch;
    a second detector for detecting a value of the current flowing through said primary coil of said transformer;
    a comparator for receiving the detected value from said second detector and for comparing the detected value with a predetermined value; and
    means for compulsory turning off said pulse signal which is applied to turn on said switch when the detected value exceeds said predetermined value.

2. The battery charger as defined in claim 1 wherein said means for compulsory turning off said pulse signal internally includes a flip-flop circuit, so that said switch is turned on at each cycle.

* * * * *

UNITED STATES PATENT AND TRADEMARK OFFICE
CERTIFICATE OF CORRECTION

PATENT NO. : 5,289,101

DATED : February 22, 1994

INVENTOR(S) : Masami Furuta et al.

It is certified that error appears in the above-identified patent and that said Letters Patent is hereby corrected as shown below:

Title page, Assignee:
    Item [73], Lines 2 and 3 should be --Okawa Electric Co., Ltd.--.

Signed and Sealed this

Twenty-eight Day of March, 1995

Attest:

BRUCE LEHMAN

Attesting Officer  Commissioner of Patents and Trademarks